Figure 1:
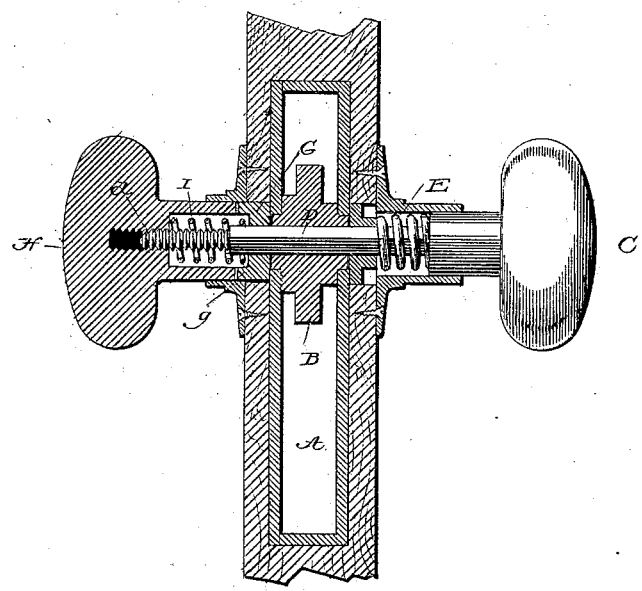

(No Model.)

E. S. WINCHESTER.
KNOB ATTACHMENT.

No. 416,311. Patented Dec. 3, 1889.

Witnesses  
N. M. Mortimer  
W. A. Kennedy

Inventor  
E. S. Winchester  
By P. T. Dodge  
Attorney

UNITED STATES PATENT OFFICE.

EDWARD S. WINCHESTER, OF DORCHESTER, MASSACHUSETTS.

KNOB ATTACHMENT.

SPECIFICATION forming part of Letters Patent No. 416,311, dated December 3, 1889.

Application filed February 15, 1889. Serial No. 300,077. (No model.)

*To all whom it may concern:*

Be it known that I, EDWARD S. WINCHESTER, of Dorchester, in the county of Suffolk and State of Massachusetts, have invented certain Improvements in Door-Latches, of which the following is a specification.

The aim of my invention is to provide a simple and secure means for attaching knobs to their spindles which will permit their ready connection and disconnection without the employment of special tools and without making any change or alteration whatever in the lock.

In the drawings I have represented my improvement in connection with a mortise-latch.

Figure 2:
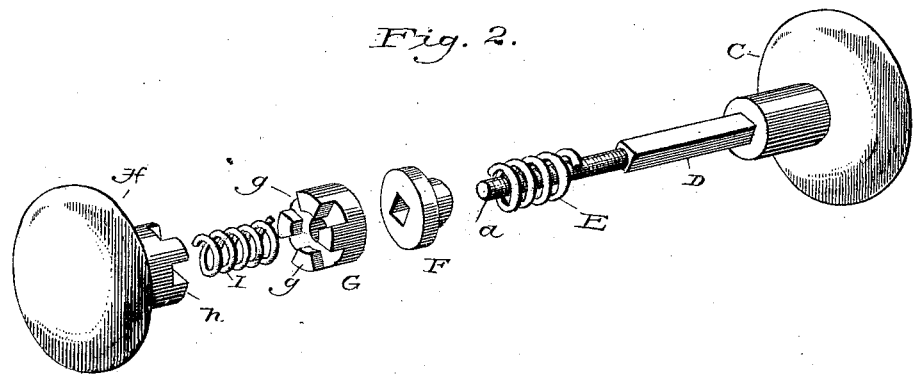

In the drawings, Figure 1 is a vertical section through a latch-case provided with my improvement, the latch and its operating devices, which may be of ordinary construction, being omitted. Fig. 2 is a perspective view showing the knobs, the knob-spindle, and the parts immediately connected therewith.

Referring to the drawings, A represents the case or body of the latch, and B the internal rotary hub or stump for operating the latch-bolt. These parts and the internal parts co-operating therewith may all be of ordinary construction.

In carrying my invention into effect I provide the parts shown in Fig. 2.

C represents an ordinary knob rigidly attached to one end of a spindle having the square or angular portion D and the threaded end d.

E represents a strong spiral spring adapted to be slipped over and around the square portion of the shank to bear against the inner end of the knob C.

F is a washer adapted to slide snugly over the square portion of the shank and to bear between the spring and the side of the lock-case or hub.

G represents a second washer, also adapted to slip snugly upon the square portion of the spindle and provided in its outer face with a series of teeth or serrations $g$.

H is the inner knob, having its shank provided with teeth or serrations $h$ to interlock with those on the washer G, and also provided with a central threaded hole to receive the end $d$ of the spindle.

I represents a spiral spring of a strength materially less than that of spring E.

In assembling the parts the spindle having the spring E and washer F thereon is inserted through the hub from the outer side of the lock. The washer G is then slipped upon the inner end of the spindle, the spring I next applied, and the knob H finally screwed upon the end of the spindle until it closely approaches the washer G. The spindle is then urged endwise by applying pressure against the outer knob C sufficient to overcome the spring E. The inner knob is then screwed farther upon the spindle, after which the outer knob is relieved from pressure, whereupon the spring E, urging the parts outward, causes the knob to interlock with washer G, as shown in Fig. 1. As this washer is prevented from rotating on the spindle, it serves as a means of locking the knob H, so that it cannot be unscrewed. To release the knob, it is only necessary to push the spindle endwise until the knob H is disengaged from the washer G, after which it may be unscrewed. The spring I serves to insure the separation of the washer G and knob H when the spindle is pushed inward.

When the parts are in operative position, washer G is inaccessible, and were it not for the presence of the spring I there would be danger of the washer G moving endwise with the spindle and retaining its engagement with the knob. The spring E, by reason of its greater strength, overcomes and compresses the spring I.

While I prefer to employ the collar F between the spring and the side of the lock-case in order to secure a smoother and easier action of the parts, it is to be understood that this is not an essential feature of my device. It may be omitted, and in such event the spring E may bear either directly against the side of the door, the side of the hub, or the side of the casing.

Having thus described my invention, what I claim is—

The knob C and its spindle having the angular and the threaded portions, in combination with the spiral spring E, the toothed collar G, the knob H, provided with the threaded hole to receive the spindle and with teeth to engage the collar G, and the spring I, of a strength less than that of spring E.

In testimony whereof I hereunto set my hand, this 18th day of December, 1888, in the presence of two attesting witnesses.

EDWARD S. WINCHESTER.

Witnesses:
C. O. L. DILLAWAY,
E. B. JAMES.